(12) United States Patent
Dennis et al.

(10) Patent No.: US 10,230,678 B2
(45) Date of Patent: Mar. 12, 2019

(54) STORING MESSAGES OF A MESSAGE QUEUE

(71) Applicant: International Business Machines Corporation, Armonk, NY (US)

(72) Inventors: Paul S. Dennis, Southampton (GB); Richard M. W. Harran, Southampton (GB); Matthew W. Leming, Romsey (GB); Anthony J. Sharkey, Hungerford (GB); Peter Siddall, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 14/831,004

(22) Filed: Aug. 20, 2015

(65) Prior Publication Data

US 2017/0054672 A1   Feb. 23, 2017

(51) Int. Cl.
*G06F 17/30* (2006.01)
*H04L 12/58* (2006.01)

(52) U.S. Cl.
CPC ........ *H04L 51/30* (2013.01); *G06F 17/30321* (2013.01); *G06F 17/30504* (2013.01); *H04L 51/26* (2013.01)

(58) Field of Classification Search
None
See application file for complete search history.

(56) References Cited

U.S. PATENT DOCUMENTS

| | | | |
|---|---|---|---|
| 6,058,389 A * | 5/2000 | Chandra | ................. G06F 9/546 |
| 6,847,991 B1 | 1/2005 | Kurapati | |
| 6,999,997 B2 | 2/2006 | Clarke et al. | |
| 7,464,138 B2 | 12/2008 | Le et al. | |
| 8,850,108 B1 | 9/2014 | Hayes et al. | |
| 2010/0198920 A1 | 8/2010 | Wong et al. | |
| 2013/0246556 A1 * | 9/2013 | Lv | ........................... G06F 9/466 709/214 |
| 2014/0336919 A1 * | 11/2014 | Li | ...................... G01C 21/3655 701/400 |
| 2016/0226776 A1 * | 8/2016 | Lee | ..................... H04L 47/2441 |
| 2016/0315762 A1 * | 10/2016 | Moon | ..................... H04L 9/065 |

OTHER PUBLICATIONS

Calciu et al., "Message Passing or Shared Memory: Evaluating the Delegation Abstraction for Multicores," OPODIS 2013, LNCS 8304, pp. 83-97, 2013, Copyright Springer International Publishing Switzerland 2013.

* cited by examiner

*Primary Examiner* — Richard L Bowen
(74) *Attorney, Agent, or Firm* — Robert J. Shatto (57) ABSTRACT

Provided is a data storage system for a computer network adapted to store a message. The data storage system includes a data storage unit and a processing unit. The processing unit stores message data of the message across one or more data elements of a data list entry of an auxiliary list in the data storage unit. The processing unit further stores an indexing pointer of the message across one or more indexing elements of an indexing list entry of an indexing list in the data storage unit. The indexing pointer is adapted to point to the data list entry. The indexing list entry further includes an indexing control element containing control information associated with the indexing list entry. The data list entry further includes control information associated with the data list entry.

20 Claims, 8 Drawing Sheets

STORING MESSAGES OF A MESSAGE QUEUE

BACKGROUND

The present invention relates to the field of message queues for a computer network, and more specifically, to storing messages of a message queue in a data storage system of a computer network.

In computer networks, message queues may be formed by storing messages in data storage systems. These data storage systems may be adapted to provide the ability for a plurality of queue managers (known as a queue sharing group) to access the same set of messages stored in the message queue. This provides a high level of availability, as more than one queue manager may process messages in a queue in parallel. A queue sharing group also allows for fault tolerance, as even if a number of queue managers fail, message data in the message queue is still accessible to at least one queue manager.

A particular processor, such as a coupling facility, may store a plurality of messages in a data storage system to form a message queue which may be accessed by a plurality of queue managers. A coupling facility may be a loosely coupled processor that is connectable to other processors or storage systems so as to enable the coupling facility to perform special or particular operations (for example, storage and provision of a shared message queue). In other words, a coupling facility may be considered to be a stand-alone processor which may be connected to one or more other processors via a high speed communication network (for example, Ethernet or a fiber optic network).

The coupling facility may store a message of a message queue as a list entry of a list defined in a memory of a data storage system of the coupling facility.

SUMMARY

According to an embodiment of the present invention there is herein provided a data storage system adapted to store one or more messages of a message queue. The data storage system includes a data storage unit and a processing unit. The processing unit is adapted to define, on the data storage unit, an indexing list and an auxiliary list. The indexing list includes an indexing list entry, where the indexing list entry includes an indexing control element and one or more indexing elements. The indexing control element contains control information associated with the indexing list entry. The one or more indexing elements include an indexing pointer. The auxiliary list includes a data list entry, where the data list entry includes a data control element and one or more data elements. The data control elements contain control information associated with the data list entry. The one or more data elements include message data. The indexing pointer of the indexing entry on the indexing list is adapted to point to the data list entry of the auxiliary list. The relative positions of the indexing list entry in the indexing list and the position of the data list entry in the auxiliary list are dependent upon information relating to characteristics of the message.

According to further embodiments of the invention there is also herein provided a computer-implementable method of storing a message of a message queue on a data storage system, and a computer program product for storing a message of a message queue on a data storage system.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

It should be understood that the figures are merely schematic and are not drawn to scale. It should also be understood that the same reference numerals are used throughout the figures to indicate the same or similar parts.

Figure 1:
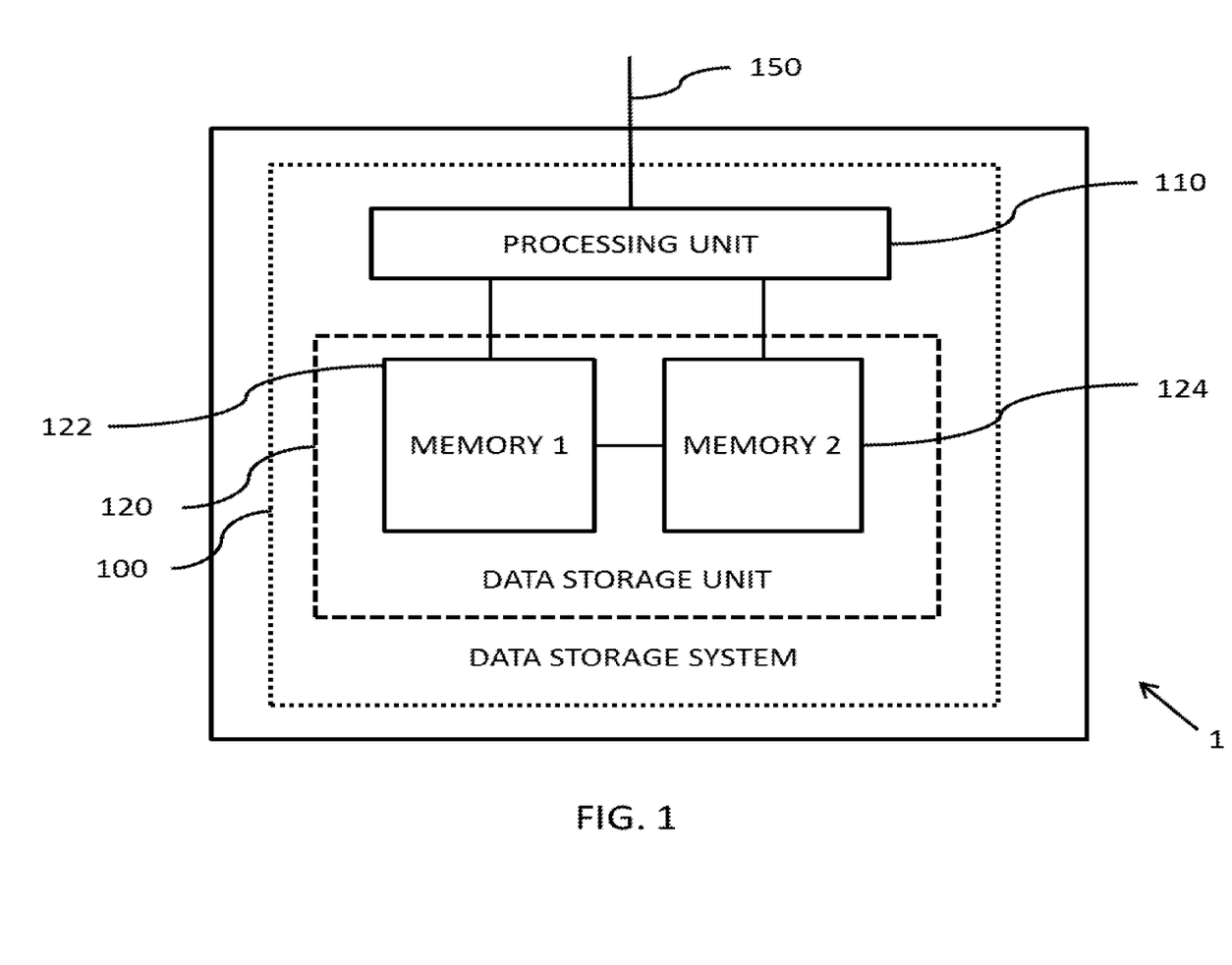
FIG. 1 illustrates a coupling facility having a data storage system, in accordance with embodiments of the present disclosure.

With reference now to FIG. 1, a coupling facility 1 may include a data storage system 100 for storing data. The data storage system 100 typically, though not always, includes a processing unit 110 and a data storage unit 120 connected together. The processing unit 110 of the coupling facility 1 may be adapted to store data on the data storage unit 120 (for example, on at least one memory 122, 124 of the data storage unit) in the form of one or more list entries in one or more lists, each list having a particular structure named a coupling facility list structure, the format of which shall be hereafter described.

Typically, though not always, the data to be stored on the at least one memory 122, 124 of the data storage unit 120 is message data of a message (of a message queue) received by the processing unit 110 (for example, from an input bus or wire 150).

The action of 'defining on the data storage unit' used throughout this document and in the claims may be thought to comprise allocating, identifying, establishing, or otherwise determining a section or segment of a memory in the data storage unit to be used for a specific purpose. In other words, defining on the data storage unit does not necessarily comprise storing data on the data storage unit.

It should be understood that the phase 'message data' (of a message) used throughout this document is intended to mean message data relating to or for the message. A skilled person would readily understand that this phrase permits message data to comprise at least one of the following: the message, data for inclusion in the message, a pointer to the message, and/or a pointer to data for inclusion in the message.

Figure 2A:
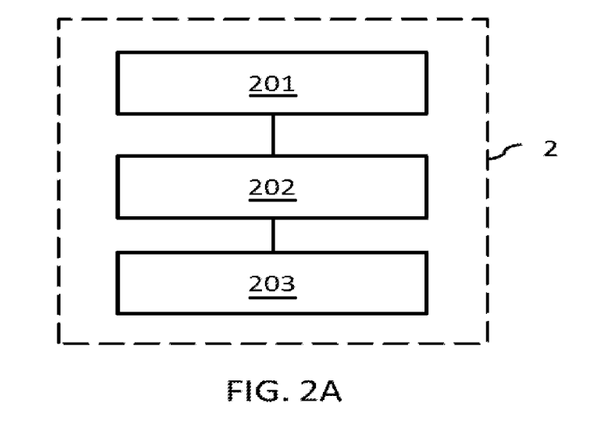
FIG. 2A schematically illustrates a list having a coupling facility list structure, the list including a plurality of list entries, in accordance with embodiments of the present disclosure.

With reference now to FIG. 2A, depicted is a conceptual schematic of a list 2 having a coupling facility list structure. The list 2 includes a first list entry 201, a second list entry 202, and a third list entry 203. It will be readily understood that a list having a coupling facility list structure is not limited to only three entries, but may comprise any number of list entries (i.e., one or more). List entries in the list having a coupling facility list structure may be accessed or individually addressed by the processing unit.

Figure 2B:
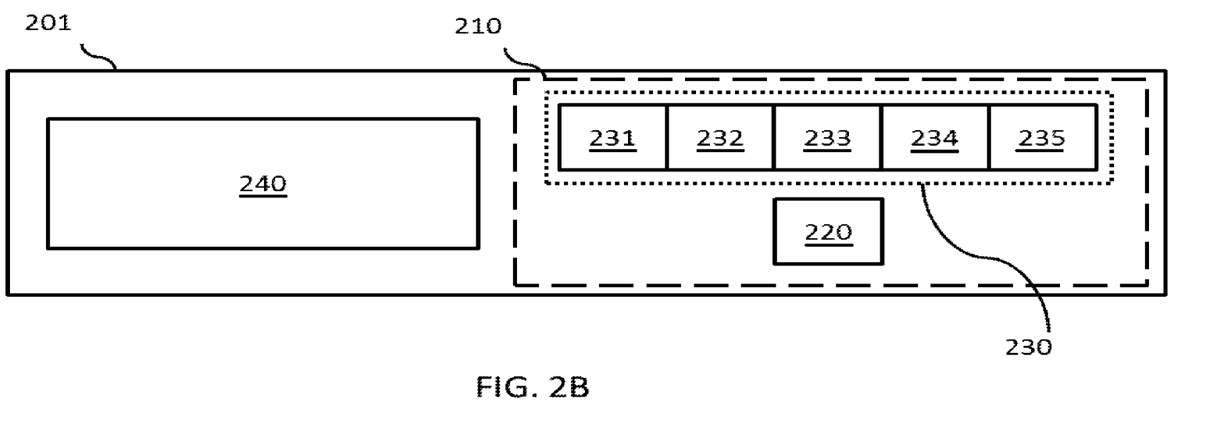
FIG. 2B schematically illustrates a first list entry of the list of FIG. 2A having a coupling facility list structure, in accordance with embodiments of the present disclosure.

An exemplary list entry of a list having a coupling facility list structure is seen in FIG. 2B, which illustrates an embodiment of the first list entry 201 of FIG. 2A. The first list entry 201 includes a list entry control element 240, which contains or otherwise defines control information associated with the list entry. The control information of the list entry may, for example, represent a unique identifier and/or a timestamp of the first list entry 201.

The first list entry 201 also includes a list element set 210 having at least one list element. The at least one list element may include, for example, a first list storage element 231. The first list storage element 231 may be adapted to hold or store user-definable data so as to enable storage of data in the first list entry 201. The list element set 210 may further comprise additional list storage elements, for example, second list storage element 232, third list storage element 233, fourth list storage element 234, and/or fifth list storage element 235. In other words, the list element set 210 may comprise one or more list storage elements 230. User-definable data may be stored across the one or more list storage elements 230. It will be readily understood that each list storage element may be considered as an additional block of memory available for data storage in the list entry 201. In other words, each list storage element of a list entry makes available, or otherwise allocates, a respective block of memory to the list entry.

The list element set 210 of the first list entry 201 may otherwise or additionally include an adjunct data area 220. The adjunct data area 220 may be adapted to hold control information (e.g., a timestamp) about the data stored in the one or more list storage elements 230. In other or further embodiments, the adjunct data area 220 may be adapted to store user-definable data.

It will be therefore apparent that user-definable data may be stored in one or more list storage elements 230 or an adjunct area 220 or both. Hence, a list entry 201 according to one or more embodiments comprises a list entry control element 240 and at least one list element 230, each of the at least one list elements being either a list storage element (e.g., 231) or an adjunct area 220. Thus, the list entry 201 need not comprise both a list storage element 231 and an adjunct area 220.

In some embodiments, a list entry may not include more than one adjunct area. In other embodiments, there may be more than one adjunct area. In an embodiment, adjunct areas may be an allocation of no more than 64 bytes of memory. In some embodiments, the list entry may comprise a maximum of 255 list storage elements, where each list storage element is an allocation of, for example, no more than 256 bytes of memory. Thus, according to at least one embodiment, the total amount of list storage available for storage of data or other user-defined information in each list entry is 65,280 bytes (255×256). In some embodiments, the list storage elements may only be accessed simultaneously, such that no single list storage element may be accessed individually. The maximum number of bytes and list storage elements are given for illustrative purposes, and are not to be construed as limiting.

Figure 3:
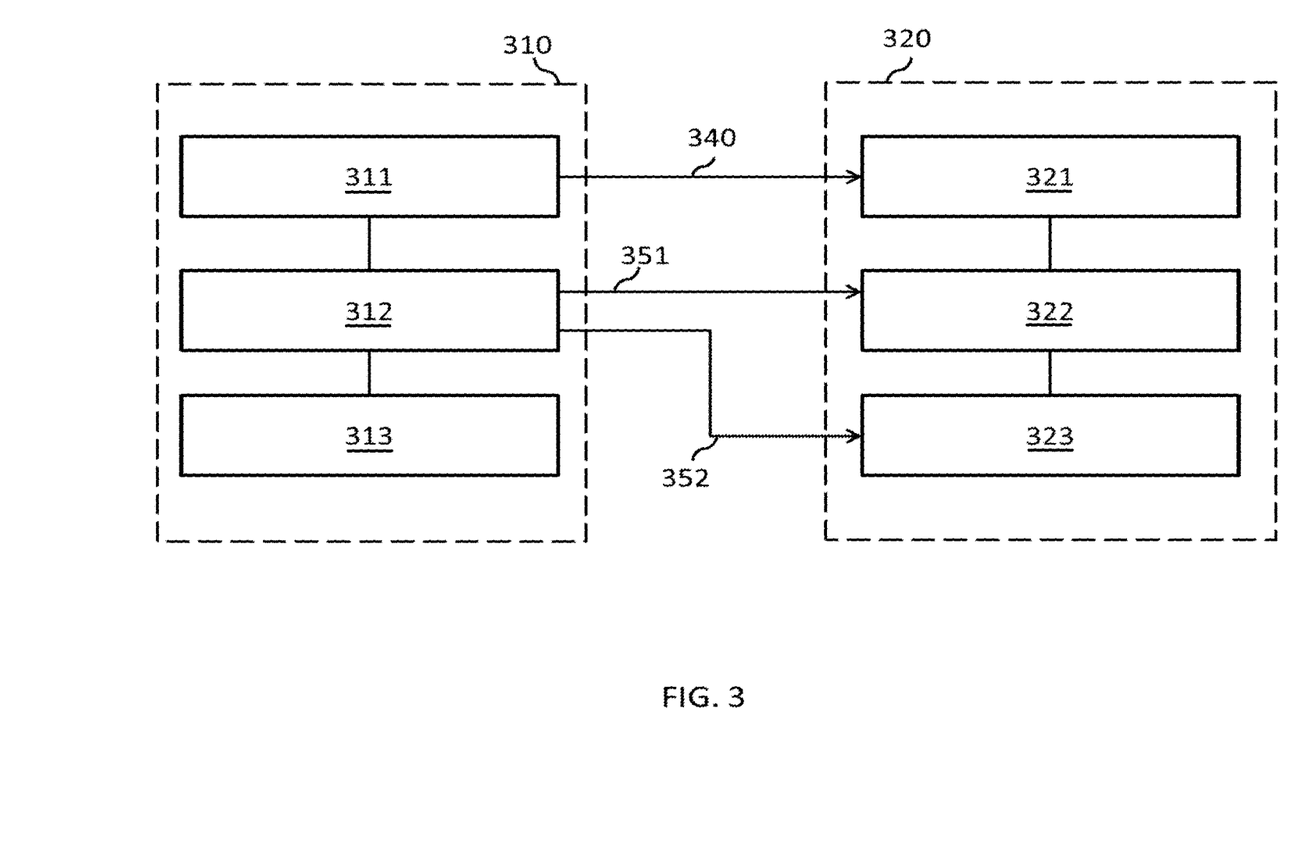
FIG. 3 illustrates a conceptual schematic of a data structure definable on a data storage unit of a data storage system for storing a message of a message queue, in accordance with embodiments of the present disclosure.

Turning now to FIG. 3, illustrated is a conceptual schematic of a data structure definable on a data storage unit 120 of a data storage system 100 for storing a message of a message queue, according to embodiments of the present disclosure. Typically, though not always, a processing unit 110 of the data storage system 100 may be adapted to define the data structure on the data storage unit 120.

Such a processing unit may define on the data storage unit two lists having a coupling facility list structure: an indexing list 310 having a plurality of indexing list entries (e.g., first indexing list entry 311, second indexing list entry 312, and third indexing list entry 313), and an auxiliary list 320 having a plurality of data list entries (e.g., first data list entry 321, second data list entry 322, and third data list entry 323).

Each indexing list entry and data list entry may be embodied as described with reference to the exemplary list entry identified in FIG. 2B. For the purposes of clarity and brevity, a list element of an indexing list entry may be alternatively named an indexing element, and a list element of a data list entry may be alternatively named a data element. That being said, for the purposes of conciseness, the structure of such indexing list entries and/or the data list entries shall not be further described.

Each indexing list entry corresponds to, and is directly associated with, a respective message of the message queue. A plurality of indexing list entries in the indexing list may therefore be considered to be the message queue, particularly for devices attempting to read messages from the message queue.

In the embodiment(s) illustrated in FIG. 3, the first indexing list entry 311 is associated with the first message in the message queue, the second indexing list entry 312 is associated with a second message in the message queue, and the third indexing list entry 313 is associated with a third message in the message queue.

In order to store the exemplary first message in the data structure, the at least one data element of at least one data list entry (in at least one auxiliary list) stores message data of the first message. By way of example, in the present embodiment, the processing unit extracts message data from the first message and stores the message data in data elements of the first data list entry 321 in the auxiliary list 320. Thus, the first data list entry 321 of the auxiliary list includes one or more data elements having message data extracted from the first message.

Each indexing list entry may store an indexing pointer across its one or more indexing elements. For example, the first indexing list entry 311, corresponding to the first message, stores a first indexing pointer across its respective one or more indexing elements. The first indexing pointer points 340 to the first data list entry 321 of the auxiliary list. Hence, the first indexing list entry 311 includes a pointer that points 340 to the data list entry 321 that stores message data of the first message.

By way of a second example, respective data elements of the second data list entry 322 and the third data list entry 323 of the auxiliary list 320 store message data of a second, different message. The second indexing list entry 312 stores respective second and third indexing pointers of the indexing list 310. The second indexing pointer points 351 to the second data list entry 322 (that contains message data of the second message), and the third indexing pointer points 352 to the third data list entry 323 (that contains further message data of the second message). Thus, the second indexing list entry 312 comprises a plurality of pointers, each pointer pointing 351, 352 to a data list entry that includes message data of the second message so that the second indexing list entry 312 is associated with the available message data of the second message.

It is clearly seen, therefore, that a processing unit may store message data of a message across one or more data entries of a list in a data storage unit. For example, the processing unit may divide a message into a plurality of data segments and store each segment across the one or more data elements of a respective data entry. A single indexing list entry may be associated with each message, and may include a plurality of indexing pointers stored across one or more indexing elements. Each such indexing pointer may point to a respective data list entry, the data list entry including message data of the message associated with the indexing element.

In at least one embodiment, the indexing pointer includes information relating to control information or other identifying data stored in the relevant data list entry so as to allow identification of the relevant data list entry.

In embodiments, a message to be stored is associated with information relating to characteristics of the message. A string of data, hereafter named an identifying key, may include data related to this information, such that the message may also be associated with an identifying key.

The identifying key may, for example, be data generated by the processing unit upon receiving the message or when storing the message (e.g., the information relating to characteristics of the message may include a timestamp of when the processing unit receives or stores the message). In other embodiments, the identifying key is data extracted from the message to be stored (for example, a priority of the message such as an inverted message priority), such that the information relating to characteristics of the message is carried by data in the message. In embodiments, the identifying key includes a priority, a timestamp, and other data, the other data corresponding to further information about the message such as, for example, an indication of from where the message to be stored originates.

The indexing list entries may be sorted or placed in the indexing list based on the information relating to characteristics of the message. For example, indexing entries associated with messages of a higher priority may be ordered higher in the indexing list than indexing entries associated with messages of a lower priority. Similarly, in embodiments, the position of an indexing list entry may be dependent upon a timestamp of the associated message such that, for example, messages received earlier by the processing unit are associated with indexing list entries stored higher in the indexing list than indexing list entries associated with messaged received later by the processing unit (e.g., a first-in, first-out queue). In other embodiments, messages received later by the processing unit may be associated with indexing list entries stored higher in the indexing list than indexing list entries associated with messages received earlier by the processing unit (e.g., a last-in, first-out queue). Embodiments may advantageously comprise a combination of ordering by priority and by time of arrival/storage.

Similarly, the data list entries in the auxiliary list may likewise be sorted with respect to the information relating to characteristics of the associated message. In embodiments, the position of a data list entry in the auxiliary list is dependent upon the position of its associated indexing list entry in the indexing list (i.e., the position of a data list entry may be indirectly dependent upon the identifying key). In other embodiments, the position of a data list entry in the auxiliary list is directly dependent upon the information relating to characteristics of the message or the identifying key of its associated message.

In embodiments, a copy of the identifying key may be stored in the adjunct areas and/or the list entry control elements of the data list entries and the indexing list entry associated with the message.

By way of example, in the embodiment described with reference to FIG. 3, the first message may have a higher priority than the second message and the lists may be sorted according to the priority of the associated messages. Accordingly, the processing unit may store the first indexing list entry 311 and first data list entry 321 (associated with the first message) higher in their respective lists than the second indexing list entry 312 and the second 322 and third 323 data list entries (associated with the second message). Because the first indexing entry (associated with the first message) is at the top position of the indexing list 310, as illustrated schematically in FIG. 3, it may be accordingly inferred that the first message has a higher priority and/or was stored earlier than other messages to be stored in the queue.

It will be readily seen that the above described arrangement allows the processing unit to store messages in more than one data list entry, where an indexing pointer of an indexing list entry stored in an indexing list points each data list entry. Thus, messages having a greater size than the available data storage of any single list entry of a list having a coupling facility list structure (e.g., one of the data list entry and/or the indexing list entry) may advantageously be stored in a message queue whilst still maintaining the coupling facility list structure. This may, for example, advantageously allow access and storage of messages in a message queue to be faster.

It is also apparent that indexing list entries in the indexing list and data list entries in the auxiliary list are orderable according to an identifying key of the associated message. For example, for messages of a higher priority, the processing unit may position the associated indexing list entry highly in the indexing list and the one or more associated data list entries highly in the auxiliary list. As the indexing list may be representative of the message queue, so it is readily understood that a higher position in the indexing list may correspond to a higher position in the message queue.

Figure 4:
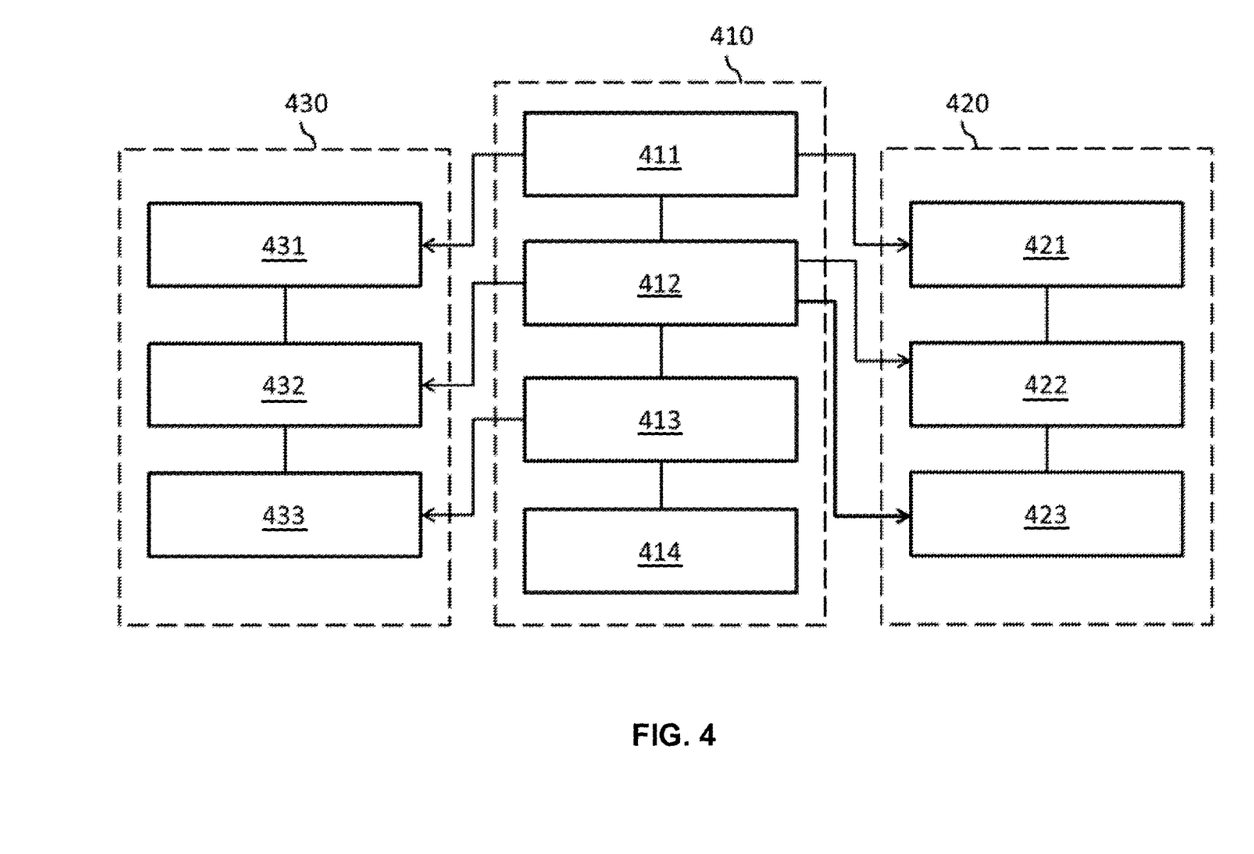
FIG. 4 depicts a conceptual schematic of a data structure definable on a data storage unit of a data storage system for storing a message of a message queue, in accordance with embodiments of the present disclosure.

Turning now to FIG. 4, illustrated is a conceptual schematic of a data structure definable on a data storage unit of a data storage system for storing a message of a message queue, in accordance with embodiments of the present disclosure. In particular, FIG. 4 identifies an indexing list 410, and a plurality of auxiliary lists including a first 420 and second 430 auxiliary list.

Each indexing list entry 411-414 in the indexing list 410 may include a plurality of indexing pointers, each indexing pointer pointing to a different data list entry in the plurality of auxiliary lists 420, 430. By way of example, a first indexing list entry 411 in the indexing list 410 may include a first and second pointer pointing to a first data list entry 421 of the first auxiliary list 420 and a first data list entry 431 of the second auxiliary list 430 respectively.

In other words, pointers in a single indexing list entry may point to data entries in different auxiliary lists. Thus, a single indexing list entry 411 may be associated with one or more data entries 421, 431 across one or more auxiliary lists 420, 430, respectively. The processing unit may therefore store message data for a single message associated with the single indexing list entry 411 across the one or more data elements of more than one data list entry in different auxiliary lists. It will be readily apparent that the processing unit may store a plurality of indexing pointers across one or more indexing elements of the indexing list entry.

A skilled person would readily understand that in embodiments, for even larger messages, a processing unit may store message data across the data elements of more than two data entries. For example, the processing unit may store message data in three or more entries. By way of example, a second indexing list entry 412 may include three indexing pointers that point to a respective three data entries 422, 423, 432 in a plurality of auxiliary lists 420, 430.

This does not, of course, exclude the possibility that the processing unit may store message data in the data elements of only a single data entry, as previously shown. For example, a third indexing element 413 may only comprise a single pointer pointing to a single data entry 433.

Each indexing element in the indexing list is not necessarily required to point to a data entry in an auxiliary list. For example, a fourth indexing list entry 414 may comprise no indexing pointers, and thereby not point to any data entries. This may occur when, for example, a message is sufficiently small that it may be stored in the indexing elements allocated to the indexing list entry.

The total memory allocated for a single indexing list entry may be of a different size to the total memory allocated for a single data list entry, and would typically be of a smaller size. For example, a single indexing list entry may have a total memory allocation of no more than 256 bytes, whereas a single data list entry may have a total memory allocation of no more than 65,280 bytes. Typically, although not exclusively, list entries in the same list (e.g., all indexing list entries in the indexing list) are all of the same size. The memory allocation of data list entries in different auxiliary lists may be of different sizes.

The indexing list and the one or more auxiliary lists may be defined in the same memory or processor (e.g., coupling facility) as one another. Alternatively, different memories or processors (e.g., coupling facilities) may store the lists. In some embodiments, a first memory/processor may store a first plurality of lists, and additional memories/processors may store a second, different plurality of lists (e.g., a first memory stores the indexing list and a first auxiliary list and a second memory stores a second auxiliary list). It is herein identified that use of different memories for different lists, and different auxiliary lists in particular, advantageously provides the flexibility to mitigate against potential memory restrictions in any given memory or processor (e.g., coupling facility).

As previously identified, the processing unit may arrange or order indexing list entries in the indexing list according to an identifying key and/or characteristics of the message each indexing list entry is associated with. In the present embodiment, for example, the first indexing list entry 411 (associated with the first message) may have a higher priority than the second 412, third 413, and fourth 414 indexing list entries.

Similarly, the processing unit may also arrange data list entries in their respective auxiliary lists according to the identifying keys (e.g., at least one characteristic) of their associated messages. For example, the data entries 422, 423 of the second message are positioned lower in the first auxiliary list 420 than the data entry 421 for the first message, implying that the first message may, for example, have a higher priority.

There may be a maximum allowable size for at least one of the indexing list and the one or more auxiliary lists (for example, indexing list 410 may not be greater than 2 GB). Accordingly, there may be a maximum allowable number of index list entries (for an indexing list) or data list entries (for an auxiliary list).

There is herein provided a manner of off-loading messages from the data storage system by, for example, the processing unit. There may be provided either externally to or within the data storage, an additional storage system (e.g., an external memory, for example, a storage class memory) adapted to store at least one indexing entry and its associated one or more data entries. The data storage system may be adapted to connect to the additional storage system so as to selectively or dynamically store an indexing element and its associated one or more data entries in the additional storage system.

For example, the processing unit may move a selected indexing entry and its associated data entries to an additional external storage system so as to free up space in the indexing list and/or auxiliary list(s) for additional or required message storage when a maximum allowable number of index list entries or data lists entries is reached. When the indexing list and/or one or more auxiliary lists have sufficient space, the processing unit may respectively replace or restore any stored indexing entries and associated data entries to the indexing list and auxiliary lists.

To detect when movement of a selected indexing entry and associated one or more data entries is required, the maximum allowable size of the indexing list and/or one or more auxiliary lists may be a threshold value (e.g., the maximum allowable size of a list need not be the overall allocated size of memory for that list). For example, the processing unit may move a selected indexing element and associated one or more data entries when the total amount of data in an indexing list is above a predetermined threshold (e.g., 60% of the overall allocated memory).

The threshold for determining when to move at least one indexing entry and associated data entry or entries may be determined based on a particular allowable number of indexing/data entries. By way of example, an indexing list may be capable of holding no more than 100 indexing entries; however, a threshold may be set to only 80 entries, such that if there are more than 80 entries in the indexing list, the processing unit may move at least one selected indexing entry and its associated data entries to an external storage system.

The selection of which indexing entry and associated data entries the processing unit moves to the additional storage system may be determined based on at least one characteristic (e.g., a priority) of the messages associated with each indexing entry. In embodiments, when a threshold is reached, and it is determined that an indexing entry and associated data entries must be moved to an additional storage system, the processing unit moves the indexing entry and associated data entries corresponding to a message having the lowest priority to the additional storage system.

It will be readily apparent that when an indexing entry and associated data entries are moved back to the indexing list and/or auxiliary lists, the data entries may not necessarily be stored in the same position and/or auxiliary list as previously. Accordingly, the indexing pointer(s) stored in the indexing entry may be refreshed or recalculated to point to the new location of the data entry or entries. In some embodiments, the indexing entry and associated data entries are moved back to the same position as they were previously.

Moving messages (e.g., an indexing entry and its associated one or more data entries) to an additional storage unit may mitigate the cost of storing large messages entirely in the data storage unit.

The processing unit may move messages to the additional storage unit asynchronously such that movement of the messages need not be dependent upon a clock of the data storage unit.

Storing the index and data list entries in a particular position in their respective lists according to at least one characteristic (e.g., an identifying key) of their associated message ensures that the movement of messages to the additional storage unit gives optimum performance. This is due to the fact that the same effective algorithm can be used for moving both the index and data list entries associated with a message, as both will be in a same relative position in their respective lists. For example, an algorithm may search for a specific indexing list entry starting from the bottom of an indexing list, and correspondingly (e.g., simultaneously) search for associated data list entries from the bottom of respective auxiliary lists so as to identify and move a message.

A further advantage to storing the index and data list entries in a particular position is that messages may be read faster from the data storage unit (by, for example, the processing unit), as messages stored higher in the data storage unit (e.g., those having a higher priority) may require less searching (e.g., data list entries higher in the auxiliary list may be found more quickly).

Figure 5:
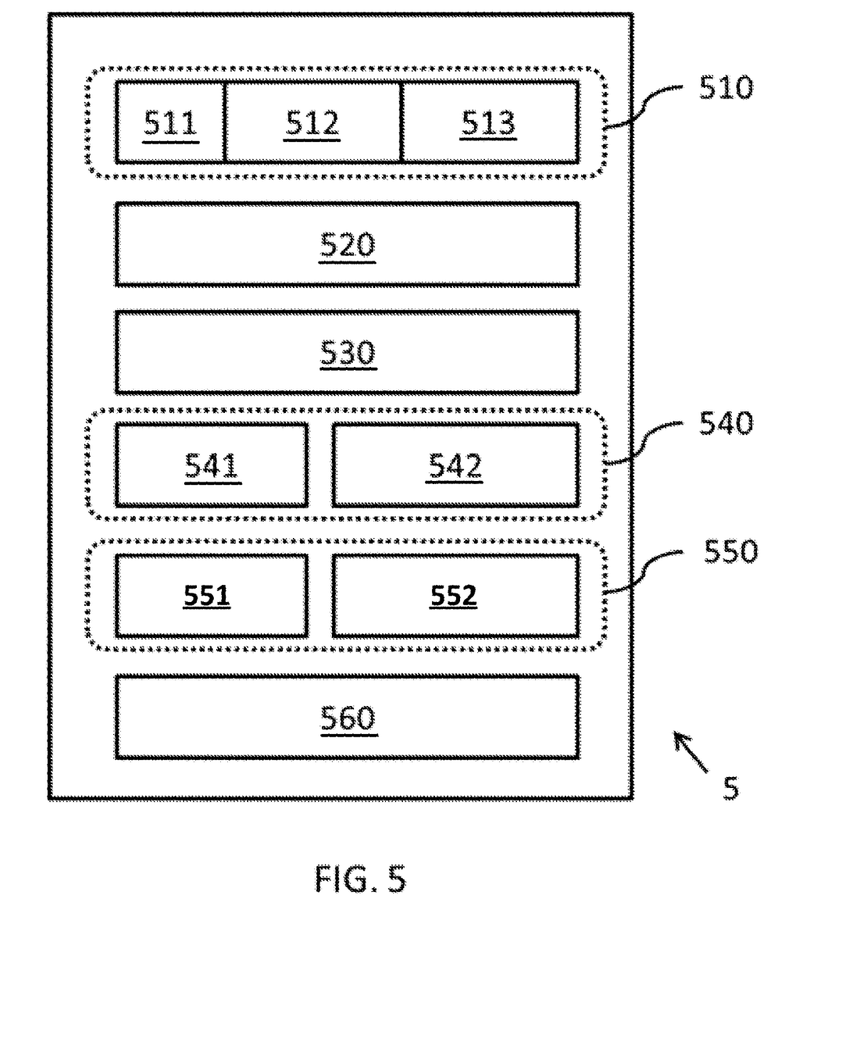
FIG. 5 illustrates a data format for storing data on an indexing list entry, in accordance with embodiments of the present disclosure.

Turning now to FIG. 5, illustrated is an index data format 5 for an indexing list entry, such as the indexing list entry 311 of the indexing list 310 (shown in FIG. 3), in accordance with embodiments of the present disclosure. In some embodiments, the indexing list entry 311 stores the data having an index data format 5 across the one or more indexing elements of the indexing list entry.

Data of an indexing list entry stored in the index data format 5 may include an identifying key (e.g., a unique message identifier) 510, which is an identifier for a single message of the message queue. Typically, but not always, because each indexing list entry is associated with a different message, the identifying key will be different for, and unique to, each respective indexing list entry. An exemplary identifying key 510 may comprise a number of data segments representing different identifying characteristics of the message. A first data segment 511 of the identifying key 510 may be data representing a priority of the message. A second data segment 512 may be unique data that represents the message (for example, a time stamp), the unique data being unique within the indexing list. A third data segment 513 of the identifying key 510 may be data representing any other information about the message (for example, information about from where the message originates).

In other or further embodiments, data stored in an index data format entry 5 may further include message control information 520, which may be data adapted to define control information about the associated message and/or the intended or potential future operation or location of the associated message.

Data stored in the index data format 5 may include a data list entry count 530, the data list entry count indicating the number of data entries to which indexing pointers of the indexing list entry point. In other words, the data list entry count 530 may indicate the number of indexing pointers that the indexing list entry includes.

Data stored in the index data format 5 may also include a plurality of indexing pointers, for example, first indexing pointer 540 and second indexing pointer 550. An indexing pointer 540 (pointing to a particular data list entry) may include a list identifier 541 identifying which auxiliary list the particular data list entry is in, and a data list entry position identifier 542 identifying where the data list entry is in the identified auxiliary list.

In other embodiments, the indexing pointers 540, 550 may include a list identifier 551, identifying an auxiliary list in which one or more associated data list entries are in, and a message segment identifier 552 which identifies what chunk or portion of the message is stored by or associated with data list entries in that list. In such an embodiment, to extract the full message, the data list entries in the identified list may be identified by searching for a particular identifying key of the data list entries.

Data stored in the index data format 5 may further include message data 560, which may, for example, only be present if there is unused space in the indexing list entry.

In embodiments, the processing unit may store the identifying key 510 and the message control information 520 in an adjunct area of the indexing list entry, and the data list entry count 530, the indexing pointers 540, 550, and the message data 560 may be stored across at least one list storage element of the indexing list entry. In at least one embodiment, the processing unit stores the identifying key 510 and/or the message control information 520 in the list entry control element of the indexing list entry.

Figure 6:
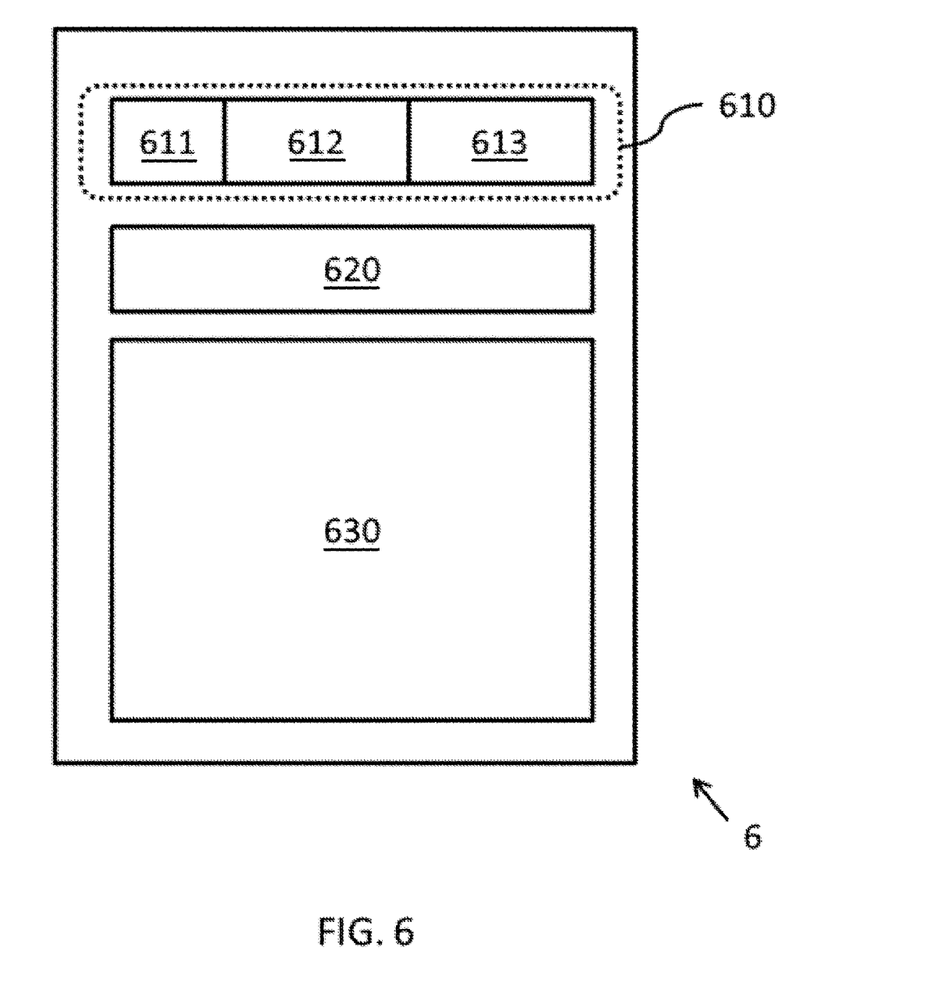
FIG. 6 illustrates a data format for storing data on a data list entry, in accordance with embodiments of the present disclosure.

Similarly, in other or further embodiments, each data list entry 321 (shown in FIG. 3) of the auxiliary list(s) 320 may be adapted to store data in another particular format, named a message data format 6, which shall now be described with reference to FIG. 6. Preferably, each data list entry 321 stores data having a message data format 6 across the one or more data elements of the data list entry.

Data stored in a message data format 6 may comprise an identifying key 610 (e.g., a unique key), which may be identical to, or generated based on, the identifying key 510 stored in the associated indexing element. In other words, both the indexing list entry and the data list entry 321 or entries to which an indexing pointer(s) of an indexing element 311 points may include the same identifying key 510, 610. Accordingly, the identifying key 610 may comprise the same number of data segments 611, 612, 613 representing the same identifying characteristics of the message as the data segments 511, 512, 513, respectively.

Data stored in a message data format 6 may further include message data 630, the message data 630 being message data of the message identified by the identifying key 610.

Optionally, data stored in the message data format 6 may further include a message data identifier 620 which includes identifying data about the message data 630. The message data identifier 620 may, for example, be indicative of where the message data 630 fits in the message (if, for example, the message data includes only a portion of the message).

In other optional embodiments, data representing the message data identifier 620 may be appended or added to the identifying key 610 such that the identifying key 610 of data stored in the message data format 6 may include the message data identifier 620 indicating, for example, where the message data 630 fits in the message.

In embodiments, the processing unit stores the identifying key 610 and the message data identifier 620 in an adjunct area of the data list entry, and the message across at least one list storage element of the data list entry. In at least one embodiment, the processing unit stores identifying key 610 and/or the message data identifier 620 in the list entry control element of the data list entry.

Figure 7:
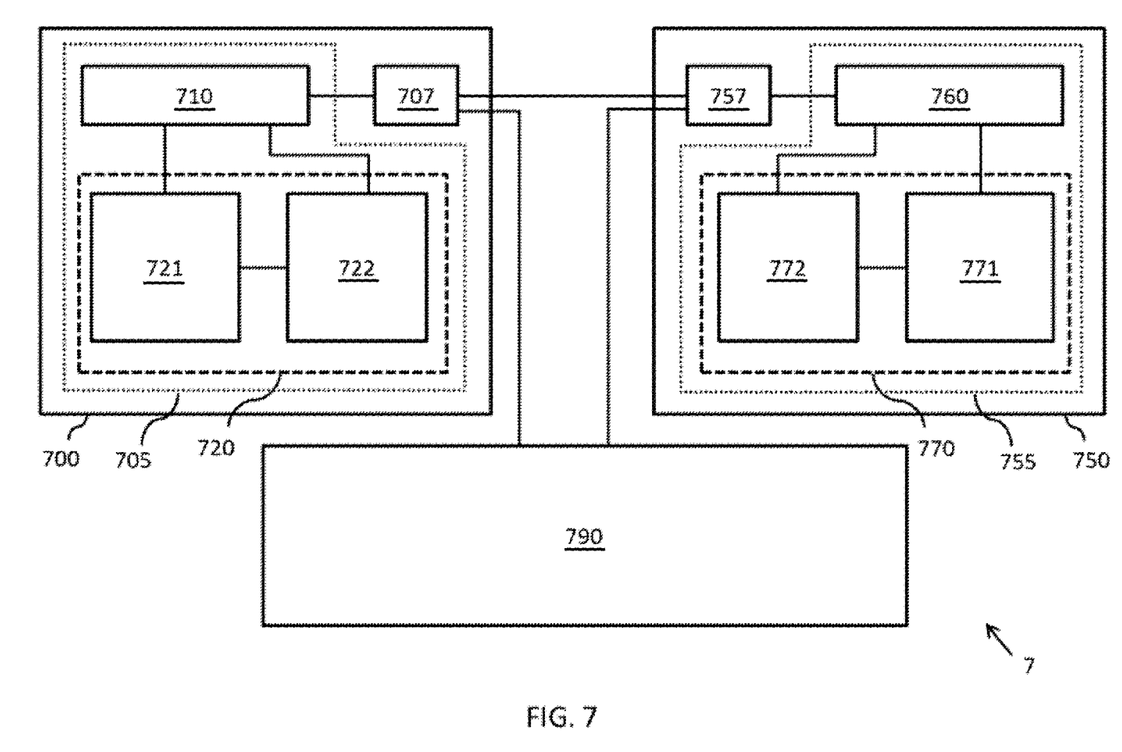
FIG. 7 schematically illustrates a computer network comprising a data storage system, in accordance with embodiments of the present disclosure.

With reference now to FIG. 7, there is identified an example of a computer network 7 which may employ a data storage system according to an embodiment.

The computer network comprises a processor 700 having a data storage system 705. The processor 700 may include, but is not limited to, PCs, workstations, laptops, PDAs, palm devices, servers, storages, and the like. Generally, in terms of hardware architecture, the processor 700 may include one or more processing units 710, one or more data storage units 720 each comprising one or more memories 721, 722, and one or more I/O devices 707 that are communicatively coupled via a local interface. The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components. The processor 700 may, in embodiments, be considered to be a coupling facility.

The presently embodied processor, a coupling facility, may include a single processing unit 710 and a single data storage unit 720, the data storage unit having a first memory 721 and an optional second memory 722. The data storage unit 720 and the processing unit 710 may be considered together, so as to cohesively form a data storage system 705.

The processing unit 710 is a hardware device for executing software that can, for example, be stored in the data storage unit 720. The processing unit 710 can be virtually any custom made or commercially available processor, a central processing unit (CPU), a digital signal processor (DSP), or an auxiliary processor among several processors associated with the processor 700, and the processing unit 710 may be a semiconductor based microprocessor (in the form of a microchip) or a microprocessor.

The data storage unit 720 can include any one or combination of volatile memory elements (e.g., random access memory (RAM), such as dynamic random access memory (DRAM), static random access memory (SRAM), etc.) and nonvolatile memory elements (e.g., ROM, storage class memory (SCM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the data storage unit 720 may incorporate electronic, magnetic, optical, and/or other types of storage media. Note that the data storage unit 720 can have a distributed architecture, where various components are situated remote from one another, but can be accessed by the processing unit 710.

The software in the data storage unit 720 may include one or more separate programs, each of which comprises an ordered listing of executable instructions for implementing logical functions. The software in the data storage unit 720 may include a suitable operating system, compiler, source code, and one or more applications in accordance with exemplary embodiments. The application may include numerous functional components for implementing the features and operations of the exemplary embodiments. The application of the data storage unit may represent various applications, computational units, logic, functional units, processes, operations, virtual entities, and/or modules in accordance with exemplary embodiments, but the application is not meant to be a limitation.

The processing unit 710 may be adapted to define on the data storage unit 720 the indexing list and the one or more auxiliary lists. The indexing list and the one or more auxiliary lists may be stored on the same memory of the data storage unit 720, for example first memory 721, or may be split across the memories 721, 722 of the data storage unit 720.

The processor 700 may optionally comprise an input/output device 707 adapted to provide the ability for the processor to externally communicate with other processors and/or memory units. This processor 700 may therefore communicate, via the input/output device 707, to other computers, processors, or memory storage devices in the computer network 7.

In optional embodiments, the computer network 7 comprises a plurality of processors, for example, additional processor 750. Additional processor 750 may include the same features as the processor 700, namely a processing unit 760, a data storage system 755 that includes a data storage unit 770 (comprising first 771 and second 772 memories), and an input/output device 757. In embodiments, each processor may be considered to be a separate coupling facility.

In such embodiments, the indexing list and the one or more auxiliary lists may be stored across data storage units of more than one processor. For example, the indexing list may be stored on the data storage unit 720 of the processor 700, and the one or more auxiliary lists may be stored on the data storage unit 770 of the additional processor 750. It will be clear to the skilled person, therefore, that the data storage system may be defined as including a plurality of processors, where the processing unit of the data storage system includes a plurality of separate processing units 710, 760 from more than one processor 700, 750 and the data storage unit of the data storage system may be defined as comprising a plurality of data storage units 720, 770 from more than one processor 700, 750.

It is therefore apparent that the indexing list and one or more auxiliary lists associated with a given message queue may be stored across more than one processor or one coupling facility.

To store a message queue, the messages of a message queue may be stored in a memory or memories of the data storage unit across a plurality of data entries in one or more auxiliary lists, each data entry being linked and indexed by an indexing entry in an indexing list. Accordingly, each indexing entry may correspond to a message, and the position of the indexing entry in the indexing list may represent the position of the respective message in the message queue.

In optional or further embodiments, the computer network 7 comprises an additional, external memory 790, where the additional, external memory 790 is adapted to be connectable to the processing unit 710 (e.g., via an input/output device 707) so as to store a selected indexing entry and its associated data entry or entries when required. Accordingly, the processing unit 710 may be adapted to select an indexing entry and its associated data entry or entries and store the indexing entry and associated data entry or entries in the additional, external memory 790. The selection of the indexing entry and associated data entries may be determined based on a priority of the message stored across the indexing and associated data entries. A selected indexing entry and associated data entry may, in embodiments, only be moved when a list (e.g., one of the indexing list and one or more auxiliary lists) defined on the one or more memories has reached a threshold data capacity.

By way of example, the first memory 721 of the data storage unit 720 of the processor 700 may be of a particular size (e.g., 4 GB). Assuming, for example, the first memory 721 of the data storage unit is the only memory available in which the indexing list and the one or auxiliary lists may be defined, the maximum allowable memory that may be used to define the lists is the particular size of the first memory. Accordingly, an indexing list in the first memory 721 may have a maximum allocated size (e.g., 500 MB). This will, correspondingly, limit the number of available indexing entries to a maximum (e.g., 100). When in the number of used indexing entries exceeds a threshold value (e.g., 80), the processing unit 710 may move a selected indexing entry (for example, the indexing entry associated with the message having the lowest priority) and its associated data to the additional memory 790. When the number of indexing entries having data stored therein drops below the threshold value (e.g., <80), a selected indexing entry (for example, the indexing entry in the additional memory 790 that has the highest priority) and its associated data entries may be moved back to the indexing list and/or auxiliary lists.

Although not limited thereto, the data storage unit 720 may in particular embodiments comprise random access memory (RAM) and the additional memory 790 may comprise storage class memory (SCM).

Figure 8:
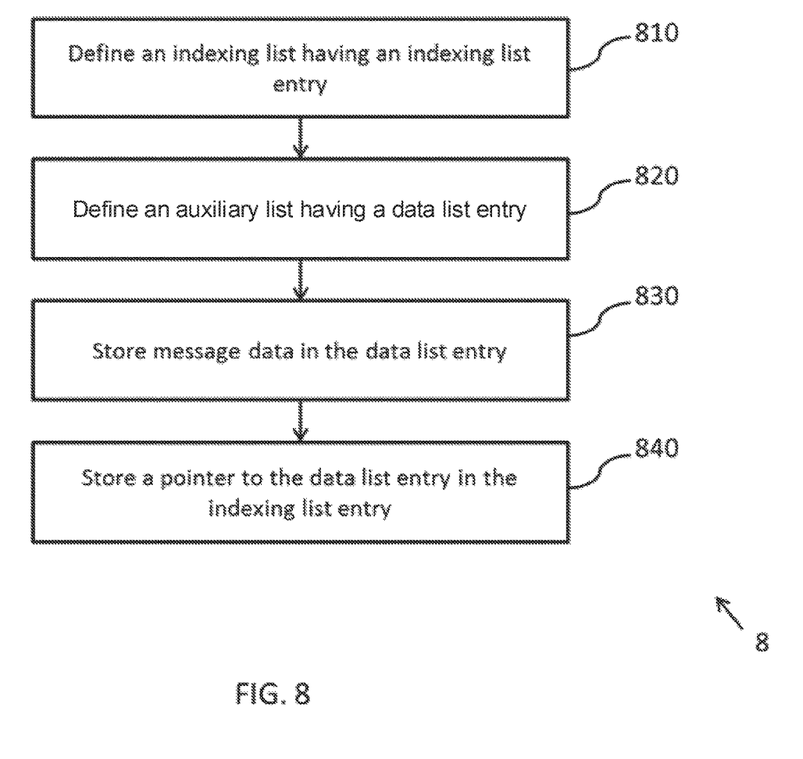
FIG. 8 is a flow chart illustrating a method of storing data on a data storage unit, in accordance with embodiments of the present disclosure.

With reference to FIG. 8, a method 8 of storing a message of a shared queue on a data storage unit can be described.

The method 8 includes defining, on the data storage unit, an indexing list having an indexing list entry at operation 810, the indexing list entry comprising at least an indexing control element and one or more list elements. The method 8 also includes defining, on the data storage unit, an auxiliary list having a data list entry at operation 820, the data list entry comprising at least a data control element and one or more data elements. The method 8 further includes storing message data of the message across the one or more data elements of the data list entry in the auxiliary list at operation 830. The method 8 additionally includes storing a pointer to the data list entry (where message data is stored) across the one or more list elements of the indexing list entry in the indexing list at operation 840. The relative position of the data list entry in the auxiliary list and the indexing list entry in the indexing list may be determined based on, or otherwise dependent upon, information relating to at least one characteristic of the message.

In embodiments, the method further includes determining where in the auxiliary list the data list entry is to be stored dependent upon information relating to at least one characteristic of the message and determining where in the indexing list the data list entry is to be stored dependent upon information relating to at least one characteristic of the message. In other or further embodiments, the data list entry is stored in the auxiliary list and the indexing list entry is stored in the indexing list, and the list is sorted according to the information relating to at least one characteristic of the message.

In the context of the present application, where embodiments of the present invention constitute a method, it should be understood that such a method is a process for execution by a computer, i.e., is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data storage system for storing one or more messages of a message queue, the data storage system comprising:
   a data storage unit; and
   a processing unit, wherein the processing unit is configured to define, on the data storage unit:
   a first auxiliary list that includes message data for a plurality of messages, the first auxiliary list having a first data list entry, the first data list entry comprising:
      a first data control element containing control information associated with the first data list entry,
      a first set of data elements, wherein the first set of data elements comprise a first message data relating to a first message, an indexing list having a first indexing list entry, the first indexing list entry comprising:
      a first indexing control element containing control information associated with the first indexing list entry, and
      a first set of indexing elements, wherein the first set of indexing elements include a first indexing pointer, wherein the first indexing pointer is adapted to point to the first data list entry of the first auxiliary list, and wherein relative positions of the first indexing list entry in the indexing list and the first data list entry in the first auxiliary list are dependent upon at least a priority of the first message.

2. The data storage system of claim 1, wherein the relative positions of the first indexing list entry in the indexing list and the first data list entry in the first auxiliary list are further dependent upon at least one of a group consisting of a time when the first message is received by the processing unit, a time when the first message is stored by the processing unit, and an indication of from where the first message originates.

3. The data storage system of claim 1, further comprising an identifying key, the identifying key comprising information relating to characteristics of the first message, the identifying key being stored in the first set of indexing elements of the first indexing list entry and in the first set of data elements of the first data list entry.

4. The data storage system of claim 1, wherein the first set of indexing elements of the first indexing list entry comprise a plurality of indexing pointers, each indexing pointer being adapted to point to a different data list entry.

5. The data storage system of claim 4, wherein the processing unit is further configured to define, on the data storage unit, a second auxiliary list, the second auxiliary list comprising a second data list entry, and wherein the plurality of indexing pointers comprises the first indexing pointer adapted to point to the first data list entry and a second indexing pointer adapted to point to the second data list entry.

6. The data storage system of claim 1, wherein the processing unit defines:
the indexing list on a first memory of the data storage unit; and
the first auxiliary list on a second, differing memory of the data storage unit.

7. The data storage system of claim 1, wherein the processing unit is further adapted to define, on the data storage unit:
a second auxiliary list, the second auxiliary list having a second data list entry, the second data list entry comprising:
a second data control element containing control information associated with the second data list entry; and
a second set of data elements, the second set of data elements including a second message data relating to a second message; and
a second indexing list entry in the indexing list, the second indexing list entry comprising:
a second indexing control element containing control information associated with the second indexing list entry; and
a second set of indexing elements, wherein the second set of indexing elements include a second indexing pointer,
wherein the second indexing list entry is associated with the second message, wherein the second indexing pointer is adapted to point to the second data list entry of the second auxiliary list, and wherein the relative position of the second indexing list entry in the indexing list and the second data list entry in the second auxiliary list is dependent upon characteristics of the second message.

8. The data storage system of claim 7, wherein:
the first set of indexing elements of the first indexing list entry includes a first unique identifier, the first unique identifier comprising priority data according to the priority of the first message;
the second set of indexing elements of the second indexing list entry includes a second unique identifier, the second unique identifier comprising priority data according to a priority of the second message; and
the first and second indexing list entries are arranged in the indexing list with respect to the priority data of their respective unique identifiers.

9. The data storage system of claim 1, wherein:
the first set of indexing elements comprises an indexing adjunct area adapted to contain information about the first message and one or more indexing storage elements adapted to contain the first indexing pointer; and
wherein the first set of data elements comprise a data adjunct area adapted to contain information about the first message data, and one or more indexing storage elements adapted to contain the first message data.

10. The data storage system of claim 1, wherein the first message data comprises a segment of the first message.

11. A computer-implemented method of storing a message of a shared queue on a data storage unit, the method comprising:
defining, on a data storage unit, an indexing list having a first indexing list entry, the first indexing list entry including a first indexing control element containing control information associated with the first indexing list entry and a first set of indexing elements;
defining, on the data storage unit, a first auxiliary list having a first data list entry, the first data list entry including a first data control element containing control information associated with the first data list entry and a first set of data elements;
storing data of a plurality of messages in the first auxiliary list, wherein message data of a first message is stored across the first set of data elements of the first data list entry of the first auxiliary list; and
storing a first indexing pointer adapted to point to the first data list entry of the first auxiliary list across the first set of indexing elements of the first indexing list entry of the indexing list,
wherein relative positions of the first indexing list entry in the indexing list and the first data list entry in the first auxiliary list are dependent upon at least a priority of the first message.

12. The computer-implemented method of claim 11, the method further comprising extracting the message data from the first message.

13. The computer-implemented method of claim 11, the method further comprising generating the indexing pointer.

14. The computer-implemented method of claim 11, the method further comprising:
defining, on the data storage unit, a second auxiliary list having a second data list entry, the second data list entry including a second data control element containing control information associated with the second data list entry and a second set of data elements;
storing the message data of the first message in the second set of data elements of the second data list entry in the second auxiliary list; and
storing a second indexing pointer in the second set of indexing elements of the second indexing list entry of the indexing list, the second indexing pointer being adapted to point to the second data list entry.

15. The computer-implemented method of claim 11, wherein the indexing list is defined in a first memory of the data storage unit, and the first auxiliary list is defined in a second memory of the data storage unit.

16. The computer-implemented method of claim 11, the method further comprising:
determining a unique identifier of the first message;
storing a copy of the unique identifier across the first set of data elements of the first data list entry of the first auxiliary list; and
storing a copy of the unique identifier across the first set of indexing elements of the first indexing list entry of the indexing list.

17. The computer-implemented method of claim 11, the method further comprising:
determining a message data identifier of the message data; and
storing a copy of the message data identifier across the first set of data elements of the first data list entry of the first auxiliary list.

18. The computer-implemented method of claim 11, wherein:
the first set of indexing elements includes an indexing adjunct area adapted to contain information about the first message and one or more indexing storage elements adapted to contain the first indexing pointer; and wherein the first set of data elements include a data adjunct area adapted to contain information about the message data and one or more indexing storage elements adapted to contain the message data.

19. The computer-implemented method of claim 11, wherein storing message data of the first message across the first set of data elements of the first data list entry of the first auxiliary list comprises storing a segment of the first message across the first set of data elements of the first data list entry of the first auxiliary list.

20. A computer program product for storing a message of a shared queue on a data storage unit, the computer program product comprising a computer readable storage medium having program instructions embodied therewith, the program instructions executable by a processing unit to cause the processing unit to perform a method comprising:

defining, on a data storage unit, an indexing list having a first indexing list entry, the first indexing list entry including a first indexing control element containing control information associated with the first indexing list entry and a first set of indexing elements;

defining, on the data storage unit, a first auxiliary list having a first data list entry, the first data list entry including a first data control element containing control information associated with the first data list entry and a first set of data elements;

storing data of a plurality of messages in the first auxiliary list, wherein message data of a first message is stored across the first set of data elements of the first data list entry of the first auxiliary list; and storing a first indexing pointer adapted to point to the first data list entry of the first auxiliary list across the first set of indexing elements of the first indexing list entry of the indexing list, wherein relative positions of the first indexing list entry in the indexing list and the first data list entry in the first auxiliary list are dependent upon at least a priority of the first message.

* * * * *